United States Patent Office 3,030,334
Patented Apr. 17, 1962

3,030,334
METALLO-PHOSPHOROUS SALTS AND USE AS POLYVINYL CHLORIDE STABILIZERS
Chrysosthenis M. Canarios, Maple Heights, Vernon J. Weir, Parma, and Robert W. Lerner, Shaker Heights, Ohio, assignors, by mesne assignments, to Ferro Corporation, Cleveland, Ohio, a corporation of Ohio
No Drawing. Filed Sept. 21, 1959, Ser. No. 841,045
7 Claims. (Cl. 260—45.75)

This invention relates to novel metallic salts of hydrogen phosphorates.

The hydrogen phosphorates or esters of phosphoric acid, or acid phosphates as they are sometimes known, are readily available in their mono basic, dibasic, or mixed mono basic and dibasic forms. Until recently, however, hydrogen phosphorates have been available only in the form of aliphatic derivatives. It has now been discovered that new metallic derivatives of aromatic hydrogen phosphorates may be employed as vinyl halide resin heat stabilizers.

The new compounds are metallo-phosphorous compounds of the following general formula:

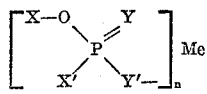

where X is selected from the group consisting of alkyl, aryl and arylalkyl groups, X' is selected from the group consisting of alkoxy, aryloxy, alkaryloxy, hydroxy and Me linked oxygen, X and X' being selected so that at least one member of the metallo-phosphorous compound is an aromatic member, y is oxygen, y' is oxygen, Me is a divalent metal selected from the group consisting of cadmium, zinc, divalent tin, lead and mixtures thereof, and $n$ is an integer from 1 to 2.

While both the monobasic and dibasic metallic derivatives function as vinyl halide heat stabilizers, the monobasic derivative has been found to produce superior results. The reason for the difference in heat stabilizing ability may be due to the fact that a divalent metal is coupled in a cyclic linkage to the dibasic acid. A cyclic metallic linkage appears to lessen the ability of the metallo-phosphorous compound to prevent the elimination of hydrogen halide from the vinyl halide resin chain. In general, the sulfur free compounds of metallo-phosphorous compounds are also preferred for use as heat stabilizers. The sulfur free compounds have been found to produce heat stability without the formation of disagreeable colors or odors which are present in the sulfur containing compounds.

The novel metallo-phosphorous compounds of this invention are compounds ranging from solids to dark brown viscous liquids. The compounds are soluble in many organic solvents, such as absolute methanol, tripropylene glycol methyl ether, and most of the common hydrocarbon solvents.

The metallo-phosphorous compounds may be prepared by direct synthesis or by an in situ formation within a vinyl resin composition. The direct synthesis is carried out by synthesizing a hydrogen phosphorate and then reacting the hydrogen phosphorate with metal acetate or metal chloride. The in situ formation is carried out by blending a metal soap with a hydrogen phosphorate and a vinyl resin and then milling on a plastic mill for about ten minutes at about 154° C. The resulting product is a heat stabilized vinyl resin containing a resin reacted metallo-phosphorous compound as a stabilizer and a fatty acid lubricant.

The following are specific examples of the metallo-phosphorous compounds of this invention as formed by the direct synthesis process. It is to be understood that these specific examples are given as a means of illustration of the invention and do not limit the spirit and scope of the new and novel organic derivatives.

Example I 120.0 g. of diheptylphenyl hydrogen phosphorate and 108.0 g. of tripropylene glycol mono ethyl ether were charged into a 500 ml. three-neck flask. The mixture was heated to 60° C. and thereafter a solution of 40.2 g. of zinc acetate dissolved in 210.0 g. of absolute methanol was added. The methanol, water and acetic acid were then distilled off until the temperature of the reaction mixture reached 110° C. at a pressure of 40 mm. of mercury. The resultant product was a dark brown, crystal clear liquid of zinc diheptylphenyl phosphorate.

Example II 10.0 g. of diheptylphenyl hydrogen phosphorate and 5.5 g. of tripropylene glycol monomethyl ether were charged into a 500 ml. three-neck flask. The mixture was heated to 60° C. and thereafter a solution of 4.1 g. cadmium acetate dissolved in 30.0 g. of absolute methanol was added. The methanol, water and acetic acid were then distilled off until the temperature of the reaction mixture reached 110° C. at a pressure of 40 mm. of mercury. The resultant product was a dark brown, extremely viscous, liquid of cadmium diheptylphenyl phosphorate.

Example III 20.0 g. of diheptylphenyl hydrogen phosphorate and 12.6 g. of tripropylene glycol monomethyl ether were charged into a 500 ml. three-neck flask. The mixture was heated to 60° C. and thereafter a solution of 6.9 g. of stannous chloride dissolved in 30.0 g. of absolute methanol was added. The methanol, water and acetic acid were then distilled off until the temperature of the reaction mixture reached 110° C. at a pressure of 40 mm. of mercury. The resultant product was a white solid mass of stannous diheptylphenyl phosphorate.

Example IV 156.5 g. of diheptylphenyl hydrogen phosphoro dithioate and 74.6 g. of tri-propylene glycol monomethyl ether were charged into a 500 ml. three-neck flask and heated to 60° C. 32.2 g. of zinc acetate dissolved in 230.0 g. of absolute methanol was then added. The flask was heated, distilling off methanol, water and acetic acid, until the temperature of the reaction mass reached 110° C. The product was a dark brown crystal clear liquid having an offensive sulfur-like odor and consisting of zinc di-(diheptylphenyl phosphorous dithioate).

Before illustrating the in situ preparation of metallo-phosphorous compounds, the theoretical mechanism of the vinyl halide stabilizing action of the meatllo-phosphorous compounds should be noted. The stabilizing action of a metal soap on a vinyl halide resin apparently arises in part from esterifying displacements of labile halide atoms. However, it appears that when a mixture of a metal soap, a hydrogen phosphorate and a vinyl halide are milled on a plastic mill, there is a partial exchange of the metal ion between the metal soap and the hydrogen phosphorate, thus resulting in the in situ formation of a metallo-phosphorous compound. The exact reaction which takes place between the metallo-phosphorous compound and the vinyl halide is unknown but it is believed that the metallo-phosphorous compounds prevent the elimination of hydrogen halide from the vinyl halide chain and thus prevent the formation of easily oxidizable polyenes.

In general, the novel metallo-phosphorous compounds are prepared in situ by mixing a hydrogen phosphorate of the general formula:

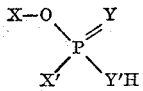

where X is selected from the group consisting of alkyl, aryl and arylalkyl groups, X' is selected from the group consisting of alkoxy, aryloxy, alkaryloxy, and hydroxy, X and X' being selected so that at least one member of the metallo-phosphorous compound is an aromatic member, y is oxygen and y' is oxygen with a metal soap and a polyvinyl halide resin and milling the mixture on a plastic mill for a sufficient time and at a sufficient temperature to produce a vinyl resin film. The preferred time is from about 5 minutes to about 20 minutes and the preferred temperature range is from 135° C. to 175° C. The soap constituent is a soap wherein the metallic component is selected from the group consisting of cadmium, zinc, divalent tin, lead and mixtures thereof. The fatty acid component of the soap may be any one of the fatty acid components commonly employed in vinyl resin stabilizer soaps such as, for instance, lauric acid, 2-ethyl hexoic acid, stearic acid, palmitic acid and capric acid.

The following are specific examples of the metallo-phosphorous compounds of this invention as formed by the in situ process:

The metallo-phosphorous compounds of this invention have been found to be especially useful as heat stabilizers for polyvinyl chloride resins, although the compounds may be employed with any polyvinyl halide resin. The term "polyvinyl halide resin" is considered to include polyvinyl halide monomers and polyvinyl halide copolymers. The metallo-phosphorous compounds when used as stabilizers may be employed in weight ranges from .05 to 6.0 parts of stabilizer per 100 parts of resin, and preferably from 0.5 part to 2 parts of stabilizer per 100 parts of resin. The following are specific examples of the novel compounds of this invention employed as stabilizers in vinyl halide compositions.

*Example V*

100 parts of polyvinyl chloride resin, 42 parts of dioctyl phthalate, 8 parts of epoxydized soybean oil, 0.25 part of stearic acid and 0.5 part of zinc diheptylphenyl phosphorate were thoroughly mixed and then milled on a plastic mill for 10 minutes at a temperature of about 154° C. The milled mixture was then fed through a three or four roll calender, to obtain a vinyl resin film.

*Example VI*

100 parts of polyvinyl chloride resin, 42 parts of dioctyl phthalate, 8 parts of epoxydized soybean oil, 0.25 parts of stearic acid, and 1.0 part of cadmium diheptylphenyl phosphorate were thoroughly mixed and then milled on a plastic mill for 10 minutes at a temperature of about 154° C. The milled mixture was then fed through a three or four roll calender to obtain a vinyl resn film.

To illustrate the heat stabilizing ability of the novel metallo-phosphorous compounds in vinyl halide resins, a heat stabilized vinyl resin film of a type well known to the art was prepared. The stabilized resin film of the prior art and the stabilized resin films of Examples VIII and IX were then cut into a plurality of samples 35 mils thick. The samples were placed on a ferro type photographic plate and subjected to aging conditions in an oven at 177° C. Samples of each formulation were removed from the oven at 15 minutes intervals to determine the effect of the high temperature aging conditions. The last sample removed from the oven which showed no signs of discoloration or decomposition is reported in the following table:

| Formulation | Prior Art | Example VIII | Example IX |
| --- | --- | --- | --- |
| Parts of: | | | |
| Polyvinyl chloride resin | 100 | 100 | 100 |
| Di-octyl phthalate (plasticizer) | 42 | 42 | 42 |
| Epoxydized soybean oil | 8 | 8 | 8 |
| Cadmium ethylhexoate | 0.75 | | |
| Zinc diheptylphenyl phosphorate | | 0.5 | |
| Cadmium diheptylphenyl phosphorate | | | 1.0 |
| Stearic Acid | 0.25 | 0.25 | 0.25 |
| Last undecomposed sample removed from oven (177° C.) at a minute intervals | 60 min. | 105 min. | 90 min.+ |

Having thus disclosed our invention, what we claim is:

1. As a new composition of matter a metallo-phosphorous compound having the following general formula:

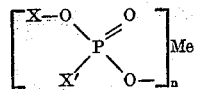

where X is selected from the group consisting of alkyl, aryl and arylalkyl groups, X' is selected from the group consisting of alkoxy, aryloxy, alkaryloxy, hydroxy and Me linked oxygen, X and X' being selected so that said metallo-phosphorous compound contains at least one aromatic group, Me is a divalent metal selected from the group consisting of zinc, cadmium and tin, and n is an integer of from 1 to 2.

2. A metallic salt of claim 1 wherein n is 2.

3. As a new composition of matter a metallic salt having the following general formula:

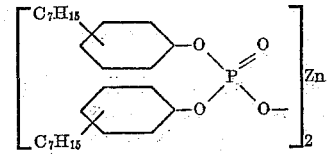

4. A stabilized resinous composition comprising polyvinyl chloride and from about .05 to 6.0 parts by weight per 100 parts polyvinyl chloride of the compound of claim 1.

5. A process for the in situ formation of a novel metallo-phosphorous compound comprising mixing an acidic phosphorous compound of the general formula:

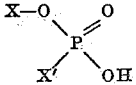

wherein X is selected from the group consisting of alkyl, aryl and arylalkyl groups, X' is selected from the group consisting of alkoxy, aryloxy, alkaryloxy, and hydroxy, X and X' being selected so that at least one member of the metallo-phosphorous compound is an aromatic member, with a fatty acid metal soap, said metal being selected from the group consisting of cadmium, zinc, divalent tin, lead and mixtures thereof, said fatty acid being selected from the group consisting of lauric acid, 2-ethyl hexoic acid, stearic acid, palmitic acid and capric acid, and polyvinyl chloride, and milling the mixture on a plastic mill.

6. The process of claim 5 wherein the acidic phosphorous compound is monobasic.

7. The process of claim 5 wherein the acidic phosphorous compound is:
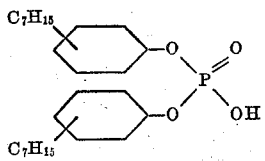
References Cited in the file of this patent
UNITED STATES PATENTS
| | | | |
|---|---|---|---|
| 2,735,835 | Wicklatz et al. | | Feb. 21, 1956 |
| 2,801,987 | Fortune | | Aug. 6, 1957 |
| 2,906,731 | Hill et al. | | Sept. 29, 1959 |

UNITED STATES PATENT OFFICE
CERTIFICATE OF CORRECTION

Patent No. 3,030,334 April 17, 1962

Chrysosthenis M. Canarios et al.

It is hereby certified that error appears in the above numbered patent requiring correction and that the said Letters Patent should read as corrected below.

Column 2, line 43, for "chloride" read -- acetate --.

Signed and sealed this 26th day of February 1963.

(SEAL)
Attest:

ESTON G. JOHNSON
Attesting Officer

DAVID L. LADD
Commissioner of Patents